July 1, 1958 R. F. E. STEGEMAN 2,841,051
TENSION TYPE SPECTACLE MOUNTING
Filed Aug. 25, 1955
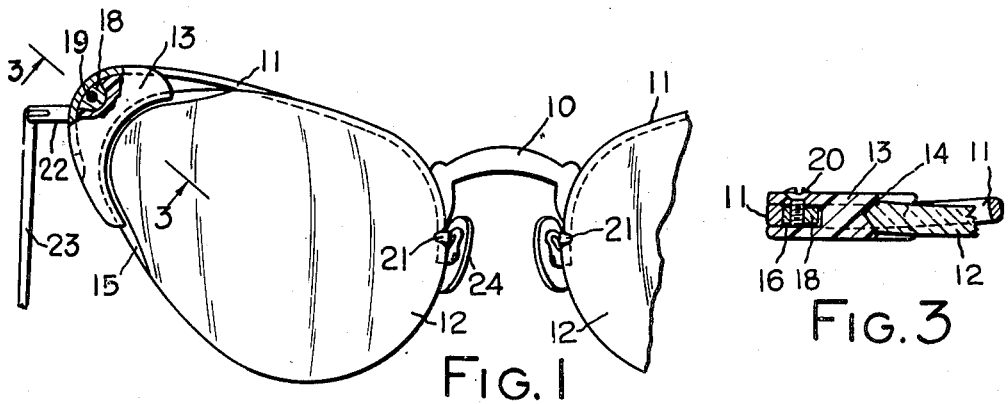
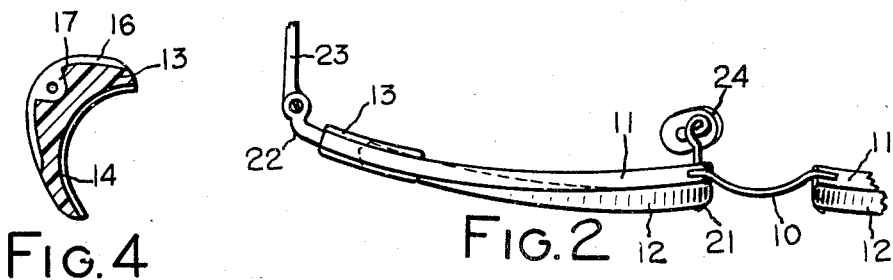
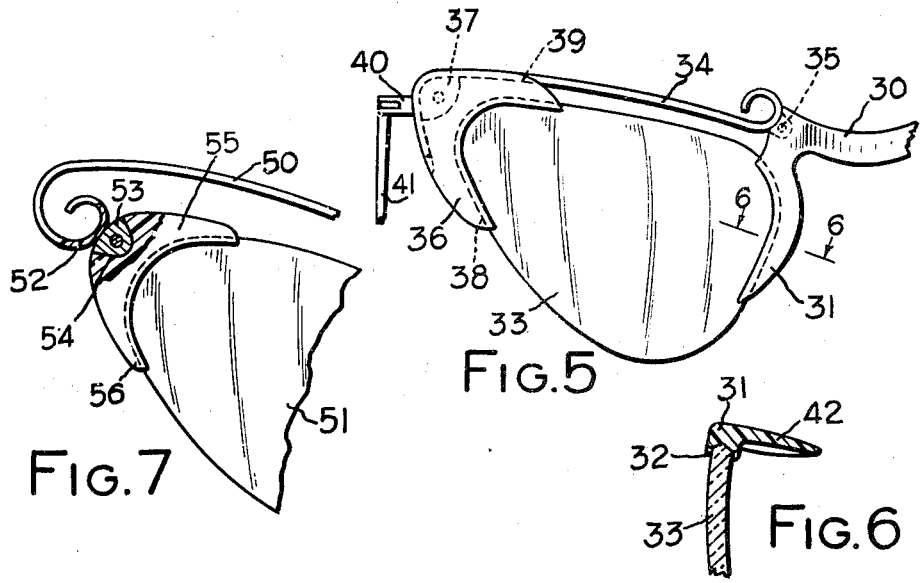
INVENTOR.
R F. E. STEGEMAN
BY
*J.A. Ellestad*
ATTORNEY

United States Patent Office 2,841,051
Patented July 1, 1958

2,841,051

TENSION TYPE SPECTACLE MOUNTING

Raymond F. E. Stegeman, Greece, N. Y., assignor to Bausch & Lomb Optical Company, Rochester, N. Y., a corporation of New York Application August 25, 1955, Serial No. 530,530

2 Claims. (Cl. 88—47)

This invention relates to spectacle mountings and more particularly it has reference to such mountings in which the lenses are yieldably held under tension between means which engage the nasal and temporal edges of the lens.

One of the objects of this invention is to provide an improved mounting of the type described in which tension is applied to the temporal edge of the lens by a non-metallic rim member. Another object is to provide a mounting of the type described in which the temporal edges of the lenses are engaged by non-metallic rim members which are releasably held in the mounting so that they may be readily changed in order to vary the cosmetic effect. Still another object is to provide in a mounting of the type described a non-metallic rim member which is detachably secured to the temporal portion of the resilient brow bar. These and other objects and advantages reside in certain novel features of construction, arrangement and combination of parts as will hereinafter be more fully explained and pointed out in the appended claims.

Referring to the drawings:

Fig. 1 is a fragmentary front view of a spectacle mounting embodying my invention, with parts shown in section.

Fig. 2 is a top plan view thereof.

Fig. 3 is a sectional view taken on line 3—3 of Fig. 1.

Fig. 4 is a vertical sectional view taken through the non-metallic rim member.

Fig. 5 is a fragmentary front view of a modification.

Fig. 6 is a sectional view taken on line 6—6 of Fig. 5.

Fig. 7 is a view of another modification with parts shown in section.

A preferred embodiment of my invention is shown in the drawing wherein 10 indicates a bridge of a spectacle mounting having the resilient metallic brow bars 11 secured to the nasal portions of the bridge 10 and extending upwardly and outwardly therefrom and beyond the temporal portions of the lenses 12. Secured to the temporal end portion of the resilient bar 11 is the non-metallic rim member 13 which may be formed of any suitable material such as plastic or the like. The inner edge of the rim member 13 is provided with a curved groove 14 for receiving the beveled temporal edge portion of the lens 12. The outer edge of the non-metallic rim member 13 is provided with a groove 16 and a recess 17 which is in communication with the groove 16.

Secured to the inner side of the temporal portion of bar 11, as by soldering for example, is the plate 18 having a threaded aperture 19. The non-metallic member 13 is positioned with the temporal edge 15 of the lens located in the groove 14 and with the temporal portion of the bar 11 positioned within the outer groove 16. The plate 18 is thereby located in the recess 17 so that the screw 20, passing through an aperture in the rear side of the member 13 and coacting with the threaded opening 19, will serve to detachably hold the non-metallic rim member 13 to the brow bar 11.

The nasal edge of the lens 12 is held against suitable lens abutment means such as the bracket 21 which is secured to and projects forwardly from the nasal portion of the brow bar 11 adjacent the bridge 10. With this structure, the lens 12 is detachably held under tension between the abutment means 21 and the non-metallic rim member 13, with the resilient brow bar 11 providing the necessary tension for clamping the lens in position. The usual endpiece 22 is secured to the temporal portion of the brow bar 11 for supporting the temple 23 in the usual manner. Nose pads 24 are carried by the bridge 10 in the customary manner.

In the modification shown in Figs. 5–6 a non-metallic bridge 30 has a downwardly projecting nasal portion 31 provided with an internal groove 32 which serves as lens abutment means for receiving the nasal edge of the lens 33. The resilient metallic brow bar 34 has its nasal end secured to the bridge 30 by means of a plate 35 which is soldered to the end of the bar 34 and is secured within a recess formed in the bridge 30. The brow bar 34 extends outwardly along the upper edge of the lens and beyond the temporal edge thereof and thence downwardly. A non-metallic rim member 36 is secured to the temporal portion of the brow bar 34 by means of a plate 37 which is soldered to the inner side of the temporal portion of the brow bar 34. The non-metallic member 36 has on its inner edge a groove 38 for receiving the temporal edge of the lens 33 and on its outer edge a groove 39 for receiving the temporal portion of the brow bar 34. The plate 37 is positioned within a recess which is formed in member 36 and is in communication with the outer groove groove 39. A screw, not shown, serves to connect the plate 37 to the non-metallic rim member 36 in the same manner as shown in the structure of Figs. 1–4. Secured to the temporal portion of the brow bar 34 is a usual endpiece 40 for pivotally mounting the temple 41. The bridge 30 which is formed of non-metallic material, such as plastic, has an integrally formed nose-engaging portion 42.

It will thus be apparent that the lens 33 is held under tension by means of the resilient brow bar which is connected to the non-metallic rim member 36 so that the latter is held against the temporal edge of the lens and thereby normally urges the nasal edge of the lens 33 against the lens abutment means such as the groove 32.

In the modification shown in Fig. 7 the resilient brow bar 50 extends upwardly and outwardly beyond the temporal edge of lens 51 and thence downwardly to a reversely formed loop 52. Secured to the loop 52 of the resilient brow bar 50 is the plate 53 which is positioned within a recess 54 formed in the outer edge of the non-metallic rim member 55. The inner edge of the rim member 55 has a groove for receiving the temporal edge portion of the lens 51. It is to be understood, of course, that the lens 51 has its nasal edge bearing against lens abutment means and that the nasal portion of brow bar 50 is connected to the bridge of the mounting so that the tension exerted by the brow bar 50 will detachably hold the lens 51 in position.

From the foregoing, it will be apparent that I am able to attain the objects of my invention and provide an improved spectacle mounting of the type described. The use of a non-metallic rim member between the metallic brow bar and the temporal edge of the lens serves to provide a cushioning means for the edge of the lens. By this construction, the liability for chipping or flaking of the lens edge is reduced. The non-metallic rim members may be suitably ornamented and since they may be readily interchanged by the optician, it is possible to thereby vary the cosmetic appearance of the mounting. Various other modifications may obviously be made without departing from the spirit of my invention as pointed out in the appended claims.

I claim:

1. In a spectacle mounting, the combination of a lens, a bridge and means for detachably connecting the lens to the bridge comprising a resilient brow bar having one end connected to the bridge and extending along the upper edge of the lens and above and beyond the temporal portion thereof, a relatively short non-metallic rim member having on its inner edge a groove in which the temporal edge of the lens is seated, and means for detachably securing the member to the temporal portion of the brow bar comprising a plate positioned in a recess formed in the outer edge of the member, said plate being soldered to the inner adjacent edge of the brow bar at the temporal portion thereof, a screw passing through aligned apertures in the member and plate and threaded to the plate and lens abutment means connected to the bridge and located adjacent to the nasal edge of the lens, the resilience of the brow bar yieldably urging the rim member against the lens to hold the nasal portion of the lens against the abutment means whereby the lens is detachably held on the mounting.

2. In a spectacle mounting, the combination of a lens, a bridge and means for connecting the lens to the bridge comprising a resilient brow bar connected to the bridge and extending along the upper edge of the lens and above and beyond the temporal portion thereof, a non-metallic rim member secured to the temporal portion of the brow bar and solely carried thereby, said member having a groove formed on its inner edge, lens abutment means connected to the bridge and positioned adjacent thereto, said rim member having a groove on its outer edge and an internal recess in communication with the last-named groove, a plate positioned in the recess and secured to the temporal portion of the brow bar which is seated in the last-named groove of the member, and a screw passing through an aperture formed in the member and threaded into the plate, said lens being positioned with its nasal edge engaging the abutment means and its temporal edge in the first-named groove of said member, the resilience of the brow bar yieldably urging the rim member against the lens to hold the nasal portion of the lens against the abutment means for detachably holding the lens on the mounting.

References Cited in the file of this patent

UNITED STATES PATENTS

| | | |
|---|---|---|
| 2,254,746 | Line | Sept. 2, 1941 |
| 2,383,572 | Splaine et al. | Aug. 28, 1945 |
| 2,513,214 | Stegeman | June 27, 1950 |
| 2,599,074 | Stegeman | June 3, 1952 |
| 2,711,671 | Cook | June 28, 1955 |
| 2,730,924 | Angelis | Jan. 17, 1956 |
| 2,756,631 | Page | July 31, 1956 |